United States Patent [19]

Borowick

[11] 4,015,266
[45] Mar. 29, 1977

[54] RADAR DIPOLE ANTENNA ARRAY

[75] Inventor: John Borowick, Bricktown, N.J.

[73] Assignee: The United States of America as represented by the Secretary of the Army, Washington, D.C.

[22] Filed: Mar. 5, 1976

[21] Appl. No.: 664,340

[52] U.S. Cl. ............................. 343/815; 343/16 M; 343/854

[51] Int. Cl.² .......................................... G01S 9/22

[58] Field of Search .......... 343/814, 815, 876, 853, 343/854, 16 M

[56] References Cited

UNITED STATES PATENTS 3,343,165  9/1967  Sleeper ........................ 343/16 M Primary Examiner—Eli Lieberman
Attorney, Agent, or Firm—Nathan Edelberg; Jeremiah G. Murray; Daniel D. Sharp

[57] ABSTRACT

A microwave antenna system particularly adapted for a two channel monopulse radar tracking system having sum and difference feed networks and respective dipole antenna arrays coupled thereto wherein one of the arrays is operated as a passive reflector or director for the other array during the transmit mode but is operated together with the other array as an active receptor during the receive mode whereby sum and difference arrays are provided in order to obtain information necessary to determine angular tracking error signals.

10 Claims, 1 Drawing Figure

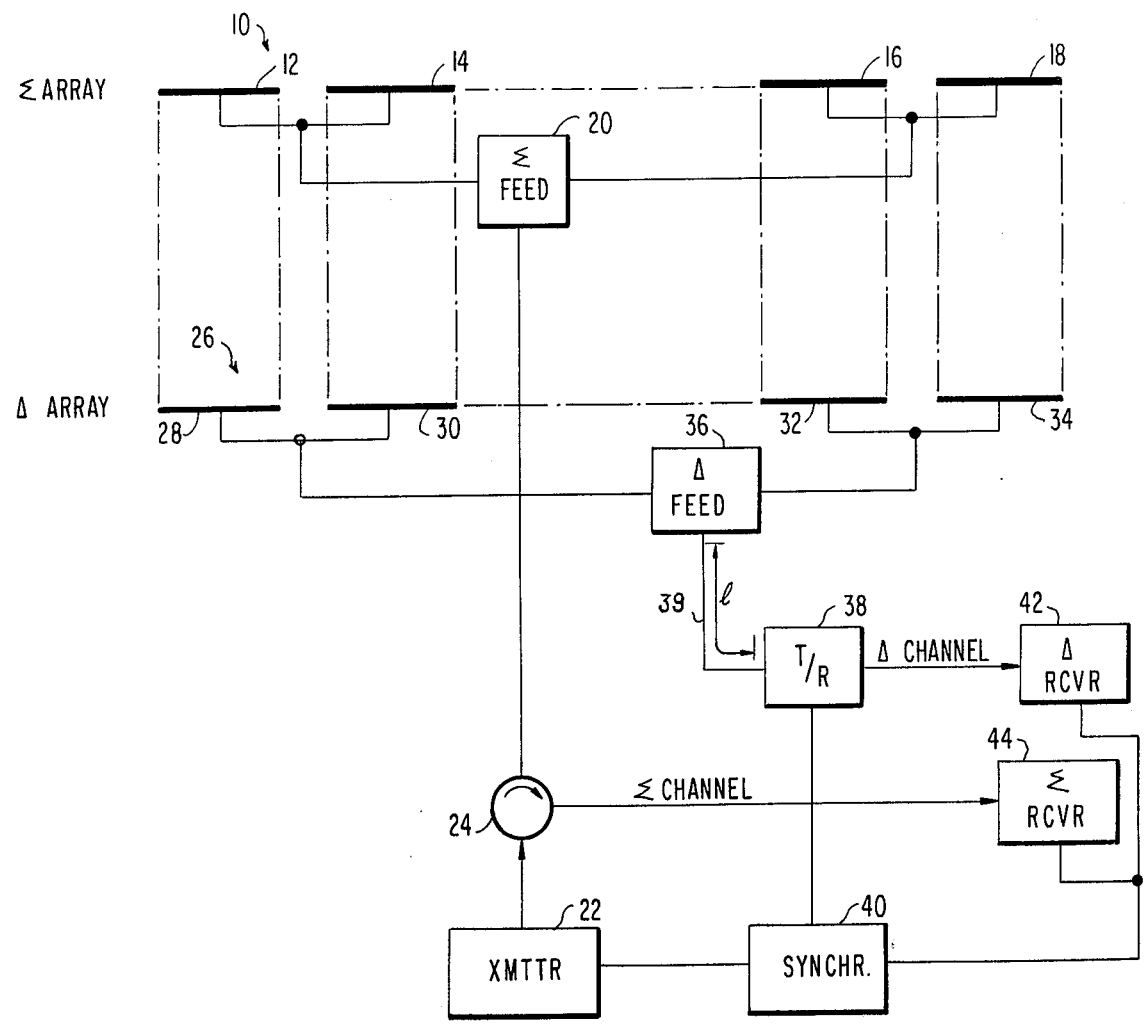

RADAR DIPOLE ANTENNA ARRAY

The invention described herein may be manufactured and used by or for the Government for governmental purposes without the payment of any royalties thereon or therefor.

BACKGROUND OF THE INVENTION

1. Field of the Invention

This invention relates generally to antenna arrays and more particularly to a dipole microwave antenna system for, inter alia, monopulse radars.

2. Description of the Prior Art

In a monopulse radar system, unlike other radar systems, more than one antenna beam is utilized. The beams are offset and the signals received therefrom are combined to simultaneously provide sum and difference signals which themselves are combined in order to obtain information necessary to determine angular tracking. Conventional two coordinate (azimuth and elevation) monopulse systems employ at least two RF channels to obtain tracking error signals from the RF characteristics of the system. One such system is disclosed in U.S. Pat. No. 3,346,861, G. G. Chadwick, et al. entitled "Sum-Difference Feed Network," dated Oct. 10, 1967. The sum and difference antenna concept is additionally taught for example in U.S. Pat. No. 3,594,811, R. L. Pierrot, entitled "Sum and Difference Antenna," July 20, 1971.

Directivity for a fixed antenna array is also obtained in various fashions, an example of which is electrically switching selected antenna elements in and out of the array. U.S. Pat. No. 1,860,123, H. Yagi, entitled "Variable Directional Electric Wave Generating Device", May 24, 1932, discloses such a means by the use of two conductor portions for each antenna element whereby if both portions are connected together, their wavelength operates to reflect electric waves whereas if one portion alone is used, it will act as either a propagator or receptor of electrical wave energy. Additional examples are shown by means of U.S. Pat. No. 3,623,109, entitled "Yagi Type Multiband Antenna . . . ", Klaus Neumann, Nov. 23, 1971, U.S. Pat. No. 3,093,826, entitled "Antenna System", C. Fink, June 11, 1963, the latter disclosing the concept of multiple lobing for obtaining directivity of a beam pattern and U.S. Pat. No. 2,632,108 entitled, "Diplexer Arrangement", O. M. Woodward, Jr., Mar. 17, 1953, which discloses the concept of beam reversing.

SUMMARY

Briefly, the subject invention is directed to a microwave antenna system including first and second dipole arrays including means for being sum and difference fed. The arrays, moreover, are physically oriented so that one of the antennas is adapted in one mode of operation to act as a passive reflector/director for the other. Accordingly, during the transmit mode, means are included for coupling microwave energy to one of the arrays while the other antenna includes means coupled thereto, for example, a feed line for a predetermined adjusted length and a T/R switch which is adapted to effectively provide a short at the antenna elements and thus act as a passive device. During the receive mode, both antenna arrays include means for operating as active sum ($\Sigma$) and difference ($\Delta$) driven receptor antennas, respectively, coupled to dual channel receiver means. Accordingly, one array, for example the sum array, acts as an active array during both the transmit and receive mode while the difference array acts as a passive array during the transmit mode but as an active array during the receive mode. The sum and difference arrays are operative in the receive mode, moreover, to obtain information necessary to determine angular tracking error signals for a monopulse radar system.

DESCRIPTION OF THE DRAWING

The FIGURE discloses in block diagrammatic form, the preferred embodiment of the subject invention.

DESCRIPTION OF THE PREFERRED EMBODIMENT

Referring now to the FIGURE, reference numeral 10 refers to a first dipole antenna array for a monopulse radar system comprised of four dipole pair elements 12, 14, 16 and 18. Each of the elements are coupled in parallel via suitable transmission lines to a two-way or bilateral summation feed network 20 which may consist of, for example, conventional hybrid couplers suitably interconnected, in a manner well known to those skilled in the art, for sum ($\Sigma$) excitation across its output ports and input ports during respective transmit and receive modes of operation. Microwave RF energy in the form of pulses are coupled from a transmitter section 22 to the feed network via an RF circulator device 24.

A second dipole array 26 also consisting of four dipole pair elements 28, 30, 32 and 34 is mutually arranged with respect to the first array 10 so as to be adapted to act as a passive reflector therefor. For the sake of illustration, element 28 is shown directly behind the element 12, the element 30 being directly behind the element 14, and so forth. In actuality, the respective elements in the two arrays 10 and 26 are positioned with respect to one another for monopulse radar use in such a fashion that it is adapted to act as a receptor or driven dipole array independent of the array 10 during the receive mode of monopulse radar operation.

Accordingly the elements 28, 30, 32 and 34 are connected in parallel via suitable transmission means to a difference ($\Delta$) feed network 36 which may also be configured from suitably connected hybrid couplers. The difference feed network 36 is coupled to a microwave switch 38, such as a well known transmit-receive (T/R) switch device commonly used in radar apparatus by means of a microwave transmission line 39 of predetermined length $l$. The T/R switch 38 is operated in accordance with a control signal from a system synchronizer 40 which is also adapted to apply suitable control pulses to the transmitter section 22 and to two radar receiver sections 42 and 44 for sum and difference channel RF signals which are respectively outputted from the circulator 24 and the T/R switch 38.

In operation, the synchronizer 40 couples a transmit pulse to the transmitter section 22 whereupon an RF pulse is coupled through the circulator 24 through the summation feed network 20 to the summation dipole array 10 whereupon it is directed to a designated target. Concurrently, synchronizer 40 couples a control signal to the T/R switch 38 so that it acts as an open circuit element. Moreover, the length (1) of the transmission line 39 is selectively chosen so that a short circuit is reflected at each of the $\Delta$ array elements 28, 30, 32 and 34 which then act as a passive reflector for the transmitting $\Sigma$ array 10.

Following transmission of a radar pulse from the Σ array 10, the synchronizer couples a control signal to the T/R switch 38, causing it to operate as a closed RF switch as well as coupling an enabling signal to the receiver sections 42 and 44. Now both the summation array 10 and the difference array 26 are adapted to be responsive to the radar return signal. Upon receipt of the radar return signal, the summation feed network 20 and the difference feed network 36 are adapted to couple RF signals through the circulator 24 and the T/R switch 38 to the respective receiver sections 42 and 44 which are operative in a well known manner to generate tracking error signals for the monopulse radar system.

Thus what has been shown and described is an arrangement wherein unique "aperture sharing" of the radiating elements is achieved in such a way as to enhance the gain and also an excitation taper independently optimized for the sum and difference feeds. While the foregoing description has been made by way of illustration it is not meant to be interpreted in a limiting sense, since when desirable, certain modifications may be resorted to without departing from the spirit and scope of the invention. For example, the sum and difference dipole arrays 10 and 26 may be utilized with other types of systems and may, when desirable, be interchanged in position such that during the transmit mode, the radiating array 10 acts as a drive dipole with a passive director, instead of a driven dipole with a passive reflector as shown in the FIGURE. Additionally, the combination of the T/R switch and microwave transmission line of length *l* is not the only means possible by which a short can be reflected back to the desired passive elements 28, 30, etc. Also the arrays 10 and 26 are not limited to four elements as shown, but may be extended to any number as required.

Having thus shown and described what is at present considered to be the preferred embodiment of the subject invention,

I claim:

1. In a microwave antenna system, the improvement comprising, in combination:
   a pair of dipole antenna arrays mutually arranged so that one of said pair of arrays is adapted to operate as a passive array for the other during a transmit mode but as an independent active array during a receive mode;
   respective RF feed networks coupled to said pair of arrays;
   RF transmitter means including coupling means coupled to the feed network for said other antenna array during said transmit mode for transmitting RF signals therefrom;
   first receiver means coupled to said coupling means and being responsive to signals received at said other array during said receive mode;
   means coupled to said feed network for said one antenna array, being operable during said transmit mode to reflect a short circuit at said one antenna array which thereby acts as a passive array, said means being operable during said receive mode, however, to translate signals from said feed network for said one array to second receiver means whereby said one array acts as an active array during said receive mode; and
   second receiver means coupled to said feed network for said one antenna array.

2. The antenna system as defined by claim 1 wherein said feed network for said one array comprises a difference (Δ) feed network and wherein said feed network for said other array comprises a sum (Σ) feed network.

3. The system as defined by claim 2 wherein said RF transmitter means comprises a monopulse radar transmitter and said pair of dipole arrays each include a plurality of dipole pair antenna elements fed in parallel by their respective feed networks.

4. The antenna system as defined by claim 3 wherein said coupling means coupling the feed network for said other antenna array comprises a microwave circulator device.

5. The system as defined by claim 4 wherein said means coupling said feed network for said one antenna array to said second receiver means comprises microwave switch means and microwave transmission line means having a length to effect said short circuit when said switch means is open circuited.

6. The system as defined by claim 5 wherein said microwave switch means comprises a transmit/receive microwave circuit element.

7. The antenna system as defined by claim 1 wherein said one antenna array is located rearwardly of said other array to thereby operate as a passive reflector for said other array.

8. The microwave system as defined by claim 1 wherein said one array is located forwardly of said other array to thereby operate as a passive director for said other array.

9. The antenna system as defined by claim 1 wherein said one dipole antenna array and said respective feed network therefor is configured as a difference array and said other dipole antenna array and respective feed network therefor is configured as a sum array in a monopulse radar system and wherein said first and second receiver means are adapted to provide information for determining angular tracking error signals for said radar system.

10. The antenna system as defined by claim 9 wherein said pair of dipole antenna arrays each include the same number of antenna elements.

* * * * *